(12) United States Patent  
Holmen

(10) Patent No.: US 7,752,901 B1  
(45) Date of Patent: Jul. 13, 2010

(54) METHOD OF DIAGNOSING THE PRESENCE OF AN EXHAUST AFTER-TREATMENT COMPONENT AND A USE OF THE METHOD FOR VEHICLE ON-BOARD DIAGNOSIS

(75) Inventor: Charlotte Holmen, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 519 days.

(21) Appl. No.: 11/909,578

(22) PCT Filed: Apr. 14, 2005

(86) PCT No.: PCT/SE2005/000545

§ 371 (c)(1),  
(2), (4) Date: Sep. 24, 2007

(87) PCT Pub. No.: WO2006/110071

PCT Pub. Date: Oct. 19, 2006

(51) Int. Cl.  
*G01M 15/10* (2006.01)

(52) U.S. Cl. .................................... 73/114.69

(58) Field of Classification Search ............... 73/114.69, 73/114.74, 114.75  
See application file for complete search history.

(56) References Cited

U.S. PATENT DOCUMENTS

| | | | |
|---|---|---|---|
| 5,219,228 A * | 6/1993 | Ker et al. ................ | 374/144 |
| 6,675,639 B1 * | 1/2004 | Schricker et al. .......... | 73/114.79 |
| 7,305,825 B2 * | 12/2007 | Ruiz et al. ................ | 60/602 |
| 2005/0102076 A1 * | 5/2005 | Kariya et al. ............. | 701/34 |
| 2006/0080959 A1 * | 4/2006 | Ruiz et al. ................ | 60/603 |

FOREIGN PATENT DOCUMENTS

| EP | 0442648 A2 | 8/1991 |
|---|---|---|
| FR | 2864145 A1 | 6/2005 |
| WO | 2004003355 A1 | 1/2004 |

OTHER PUBLICATIONS

International Search Report for corresponding International Application PCT/SE2005/000545.  
International Preliminary Report on Patentability for corresponding International Application PCT/SE2005/000545.

* cited by examiner

*Primary Examiner*—Eric S McCall  
(74) *Attorney, Agent, or Firm*—WRB-IP LLP

(57) ABSTRACT

In a method for diagnosing the presence of an internal combustion engine exhaust aftertreatment component on a vehicle, the exhaust temperature is measured downstream the aftertreatment component continuously over a time period to provide a first temperature signal with fluctuating amplitude. The temperature signal is modified to provide a second modified temperature signal. The first and second temperature signals are compared to detect any significant difference between the signals.

11 Claims, 1 Drawing Sheet

METHOD OF DIAGNOSING THE PRESENCE OF AN EXHAUST AFTER-TREATMENT COMPONENT AND A USE OF THE METHOD FOR VEHICLE ON-BOARD DIAGNOSIS

BACKGROUND AND SUMMARY

The present invention relates to a method for diagnosing the presence of an internal combustion engine exhaust aftertreatment component on a vehicle.

In recent years, statutory requirements pertaining to emissions from Diesel engines have been tightened up. For example, new legislation regarding on-board diagnosis requires that the presence of a so-called pre-catalyst is determined.

It is desirable to provide a method to determine whether an aftertreatment component in an aftertreatment system is present or not.

BRIEF DESCRIPTION OF THE DRAWINGS

The invention will be described in greater detail below with reference to embodiments shown in the accompanying drawings.

DETAILED DESCRIPTION

Figure 1:
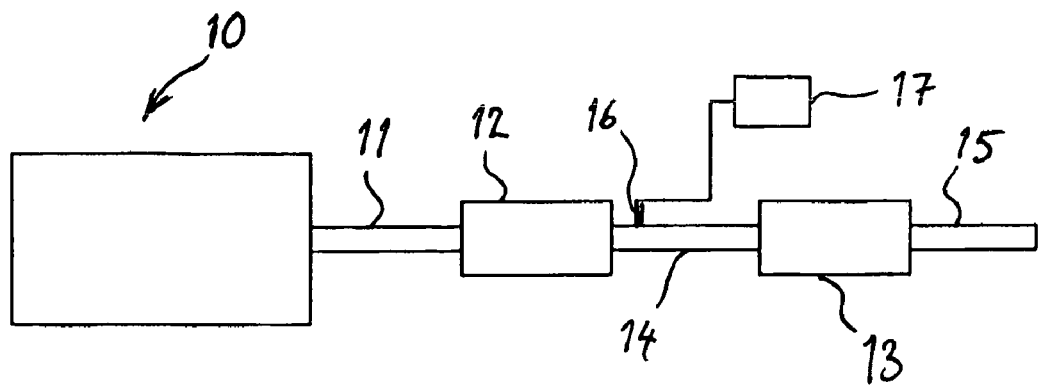
In FIG. 1, an internal combustion engine with an exhaust aftertreatment system for utilizing the invention is illustrated diagrammatically.

FIG. 1 shows a general configuration of an exhaust aftertreatment system for an internal combustion engine 10, including a first exhaust pipe segment 11 leading exhausts from the engine to a pre-catalyst 12. The pre- catalyst is connected to a selective catalyst reactor 13 via a second exhaust pipe segment 14. A third exhaust pipe segment 15 leads exhausts from the reactor 13 to the atmosphere.

Figure 2:
FIG. 2 is a first graph illustrating temperature variations in the exhaust aftertreatment system shown in FIG. 1.

A temperature sensor 16 is positioned at the second exhaust pipe segment 14 for measuring the temperature of the exhaust stream exiting the pre-catalyst 12. The temperature is measured continuously over a time period to provide a first temperature signal with fluctuating amplitude that is recorded by a data processor 17. A typical temperature/time graph is shown in FIG. 2. Due to the fact that the pre-catalyst 12 comprises a thermic mass, i.e. the reactor monolith, the exhaust temperature variations are filtered when the exhaust stream passes through the pre-catalyst.

Figure 3:
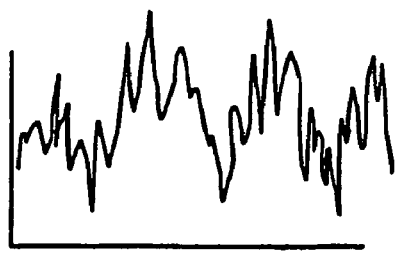
FIG. 3 is a second graph illustrating temperature variations in the exhaust aftertreatment system.

An example of a typical un-filtered temperature graph is shown in FIG. 3, showing temperature variations with higher frequency than in FIG. 2. If the pre-catalyst 12 is not present in the exhaust aftertreatment system, the temperature sensor 16 will provide a signal with a similar signature as the graph shown in FIG. 3.

The recorded temperature signal is modified by the data processor 17 to provide a second modified temperature signal. The first and second temperature signals are compared to detect any significant difference between the signals. The modified signal may be obtained by any type of analysis of the temperature signal that is based on signal frequency or signal derivative. For example, a low-pass filter in the data processor 17 may be used for removing signals with frequency over a certain level. By integrating the unfiltered and filtered temperature signals and calculating the difference between the two, it is possible to determine whether the catalyst reactor monolith is present. A large difference is the result when the monolith is missing and a small difference when the monolith is present.

If the pre-catalyst is not present in the aftertreatment system, the first signal will have a signature similar to the graph of FIG. 3. When the signal has been modified by means of the data processor 17, the resulting second signal will have a signature similar to the graph of FIG. 2. Thus, the comparison between the two signals positively indicates that no catalyst reactor monolith is present upstream the temperature sensor 16.

If the pre-catalyst is present, both first and second signals will have signatures similar to the graph of FIG. 2. Thus, the comparison between the two signals positively indicates that a thermic mass, e.g. a catalyst reactor monolith is present in the aftertreatment system upstream the temperature sensor 16.

The invention is not to be regarded as being limited to the illustrative embodiments described above, but a number of variants and modifications are- possible within the scope of the following patent claims. For example, the method according to the invention can be applied to any- type of aftertreatment component, as long as it comprises a thermic mass. The aftertreatment component may for example be a particle filter. It is preferable that the aftertreatment component being diagnosed with the method according to the invention has a larger thermic mass than any other aftertreatment component positioned upstream. The comparison of the two temperature signals can be performed in many different ways, both analogical and digital.

The invention claimed is:

1. A method of diagnosing the presence of an internal combustion engine exhaust aftertreatment component on a vehicle using a single temperature signal source, wherein the aftertreatment component component comprises a thermic mass, comprising
    measuring the exhaust temperature downstream of the aftertreatment component continuously over a time period to provide a first temperature signal with fluctuating amplitude,
    modifying the temperature signal to provide a second modified temperature signal using a temperature signal analysis based on signal frequency or signal derivative, and
    comparing the first temperature signal and the second modified temperature signal to determine whether there is a difference between the signals.

2. A method according to claim 1, wherein the aftertreatment component is a catalyst reactor.

3. A method according to claim 2, wherein the aftertreatment component is positioned as a first aftertreatment component downstream of the engine.

4. A method according to claim 3, wherein modifying comprises filtering the temperature signal.

5. A method according to claim 4, wherein the first temperature signal is unfiltered, the method comprising integrating both the first temperature signal and the second modified filtered temperature signal and calculating a difference between the two integrals.

6. Use of a method according to claim 1 for on-board diagnosis of presence of a catalyst reactor in an exhaust aftertreatment system of a vehicle.

7. A method according to claim 1, wherein the aftertreatment component is positioned as a first aftertreatment component downstream of the engine.

8. A method according to claim 7, wherein modifying comprises filtering the temperature signal.

9. A method according to claim 8, wherein the first temperature signal is unfiltered, the method comprising integrating both the first temperature signal and the second modified temperature signal and calculating a difference between the two integrals.

10. A method according to claim 2, wherein modifying comprises filtering the temperature signal.

11. A method according to claim 10, wherein the first temperature signal is unfiltered, the method comprising integrating both the first temperature signal and the second modified temperature signal and calculating a difference between the two integrals.

\* \* \* \* \*